United States Patent
Cheng et al.

(10) Patent No.: US 9,939,106 B2
(45) Date of Patent: Apr. 10, 2018

(54) PORTABLE TERMINAL HOLDER

(71) Applicant: Huawei Technologies Co., Ltd., Shenzhen, Guangdong (CN)

(72) Inventors: Linhui Cheng, Wuhan (CN); Haojie Zhang, Wuhan (CN); Guangyao Zhu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/432,417

(22) Filed: Feb. 14, 2017

(65) Prior Publication Data

US 2017/0152991 A1    Jun. 1, 2017

Related U.S. Application Data

(63) Continuation of application No. PCT/CN2014/084477, filed on Aug. 15, 2014.

(51) Int. Cl.
  *F16M 13/06*  (2006.01)
  *A45F 5/10*   (2006.01)
  *F16M 13/04*  (2006.01)

(52) U.S. Cl.
  CPC .............. *F16M 13/06* (2013.01); *A45F 5/10* (2013.01); *F16M 13/04* (2013.01); *A45F 2200/0516* (2013.01); *A45F 2200/0525* (2013.01)

(58) Field of Classification Search
  CPC .............. A45F 5/10; A45F 2200/0516; A45F 2200/0525; F16M 13/04; F16M 13/06; G06F 1/1626

USPC ..... 294/142, 145; 361/679.3, 679.55, 679.56
  See application file for complete search history.

(56) References Cited

U.S. PATENT DOCUMENTS

| | | | | |
|---|---|---|---|---|
| 7,035,094 B2 * | 4/2006 | Huang | .................. | G06F 1/1632 361/679.55 |
| 7,889,494 B2 * | 2/2011 | Stampfli | ................... | A45F 5/00 224/663 |
| 8,244,299 B1 * | 8/2012 | Bishop | ................ | H04M 1/0281 439/660 |
| D682,946 S * | 5/2013 | Ashida | ......................... | D21/333 |
| 2004/0233631 A1 | 11/2004 | Lord | | |
| 2005/0002160 A1 * | 1/2005 | Chen | .................... | G06F 1/1632 361/679.4 |

(Continued)

FOREIGN PATENT DOCUMENTS

CN    2860002 Y    1/2007
CN    103038722 A   4/2013
(Continued)

*Primary Examiner* — Dean J Kramer

(57) ABSTRACT

A portable terminal holder includes a supporting part, a plug, and a holding part. The supporting part includes a bottom part and a back part, where the back part bends and extends from an edge of the bottom part, the bottom part is configured to bear a frame of a portable terminal, and the back part is configured to bear a back of the portable terminal. The plug bends and extends from the bottom part, the plug and the back part extend in a same direction relative to the bottom part, a spacing is provided between the plug and the back part, the plug is configured to be inserted into a socket provided on the frame of the portable terminal, and the plug and the supporting part jointly position the portable terminal.

6 Claims, 7 Drawing Sheets

(56) References Cited

U.S. PATENT DOCUMENTS

| | | | |
|---|---|---|---|
| 2007/0032273 A1* | 2/2007 | Hsiao | A45F 5/02 |
| | | | 455/575.1 |
| 2008/0156836 A1 | 7/2008 | Wadsworth et al. | |
| 2009/0168336 A1* | 7/2009 | Yokote | G06F 1/1632 |
| | | | 361/679.55 |
| 2013/0001382 A1 | 1/2013 | Jang | |
| 2013/0005401 A1* | 1/2013 | Rosenhan | G06F 1/1626 |
| | | | 455/557 |
| 2013/0010421 A1 | 1/2013 | Fahey et al. | |
| 2013/0293731 A1* | 11/2013 | Kim | H04N 5/2251 |
| | | | 348/211.2 |
| 2014/0118923 A1 | 5/2014 | Stanley | |
| 2014/0146193 A1* | 5/2014 | Yang | H04N 5/23203 |
| | | | 348/211.4 |
| 2014/0326852 A1 | 11/2014 | Le Gette et al. | |
| 2015/0264165 A1 | 9/2015 | Yang et al. | |

FOREIGN PATENT DOCUMENTS

| | | |
|---|---|---|
| CN | 103047520 A | 4/2013 |
| CN | 202995529 U | 6/2013 |
| CN | 103283314 A | 9/2013 |
| DE | 20318230 U1 | 3/2004 |

\* cited by examiner

PORTABLE TERMINAL HOLDER

CROSS-REFERENCE TO RELATED APPLICATIONS

This application is a continuation of International Application No. PCT/CN2014/084477, filed on Aug. 15, 2014, the disclosure of which is hereby incorporated by reference in its entirety.

TECHNICAL FIELD

The present invention relates to a holder structure, and in particular, to a portable terminal holder.

BACKGROUND

Smartphones and tablet computers become increasingly popular. Using a tablet computer for learning and entertainment on public transportation vehicles such as a subway and a bus has become a trend. However, as a frame of the tablet computer is getting narrower, it is prone to cause a misoperation when the tablet computer is held by hand. When a subway or a bus starts and stops, there is quite large inertia, and people cannot hold onto a handrail when operating a tablet computer with both hands, which causes a quite high potential risk to physical safety. Moreover, it is difficult to hold the tablet computer with one hand.

SUMMARY

Embodiments of the present invention provide a portable terminal holder that has an advantage that a portable terminal can be held with one hand.

According to an aspect, the present invention provides a portable terminal holder, including a supporting part, a plug, and a holding part. The supporting part includes a bottom part and a back part, where the back part bends and extends from an edge of the bottom part, the bottom part is configured to bear a frame of a portable terminal, and the back part is configured to bear aback of the portable terminal; the plug bends and extends from the bottom part, the plug and the back part extend in a same direction relative to the bottom part, a spacing is provided between the plug and the back part, and the plug is configured to be inserted into a socket provided on the frame of the portable terminal, so that the plug and the supporting part jointly position the portable terminal; and the holding part includes a handle and a connection part, where the connection part is connected to the bottom part, and the handle is on a side that is of the connection part and that is away from the bottom part.

In a first possible implementation manner, the portable terminal holder further includes a pin-jointed structure, where the pin-jointed structure is configured to rotationally connect the connection part to the bottom part, so that the holding part can rotate relative to the supporting part, the pin-jointed structure positions the holding part in a first position, a second position, or a third position; and when the holding part is positioned in the first position, the handle is configured to be held by a user, or when the holding part is positioned in the second position, the handle is configured to support the portable terminal holder on a countertop together with the portable terminal, or when the holding part is positioned in the third position, the holding part fits closely to the supporting part.

In a second possible implementation manner, the bottom part is perpendicular to the back part.

In a third possible implementation manner, the plug is located in a central position of the bottom part.

In a fourth possible implementation manner, the back part includes a first back and a second back, there is a hollow region between the first back and the second back, and a projection of the first back on the bottom part and a projection of the second back on the bottom part are respectively on both sides of the plug.

In a fifth possible implementation manner, both the supporting part and the holding part are a metal sheet metal part.

With reference to the fifth possible implementation manner, in a sixth possible implementation manner, an anti-slip layer is wrapped around an outer surface of the handle of the holding part.

In a seventh possible implementation manner, the handle has a telescopic structure.

In an eighth possible implementation manner, the supporting part further includes a magnetic region, and fixation between the portable terminal holder and the portable terminal is strengthened by magnetic force between the magnetic region and the portable terminal.

With reference to the eighth possible implementation manner, in a ninth possible implementation manner, the magnetic region includes a magnetic material, and the magnetic material is embedded in the bottom part or the back part.

Compared with the prior art, the portable terminal holder provided in the present invention bears a portable terminal by using a supporting part; in addition, a plug connected to the supporting part matches a socket of the portable terminal to implement stable connection and positioning between the portable terminal and the portable terminal holder; and it is implemented, by using a holding part, that a user can hold the portable terminal with one hand.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
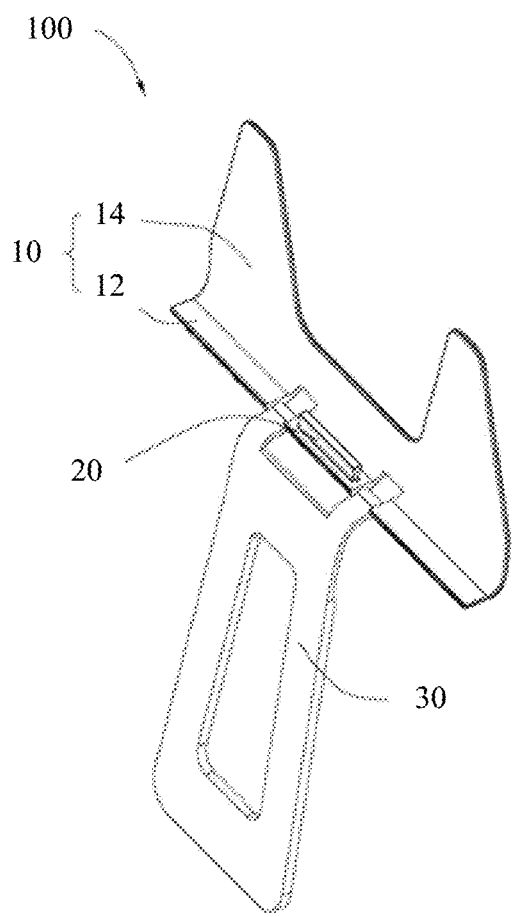
FIG. 1 is a three-dimensional schematic diagram of a portable terminal holder according to an implementation manner of the present invention.
Figure 2:
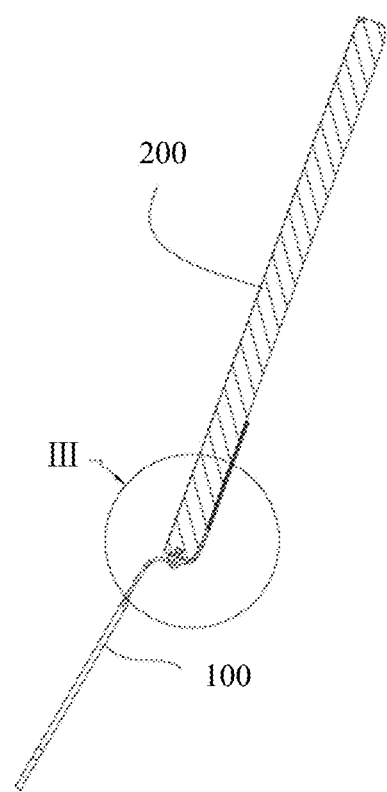
FIG. 2 is a sectional view in which a portable terminal holder and a portable terminal are used together according to an implementation manner of the present invention.
Figure 3:
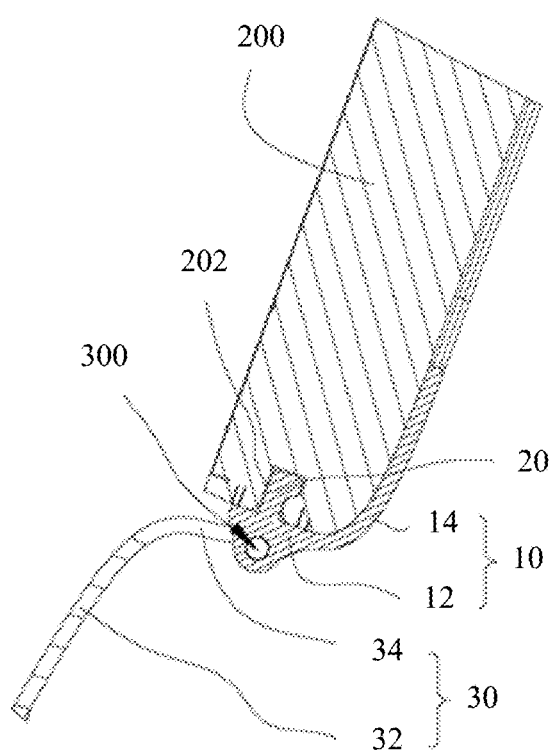
FIG. 3 is an enlarged schematic diagram of a part III shown in FIG. 2.

The present invention provides a portable terminal holder 100 that is used together with a portable terminal 200 (for example, a tablet computer or a smartphone), and a user may operate the portable terminal 200 by holding the portable terminal holder 100 with one hand. FIG. 1 is a three-dimensional schematic diagram of the portable terminal holder 100 according to an implementation manner of the present invention, and FIG. 2 is a sectional view in which the portable terminal holder 100 and the portable terminal 200 are used together. Referring to FIG. 1, the portable terminal holder 100 includes a supporting part 10, a plug 20, and a holding part 30. The supporting part 10 includes a bottom part 12 and a back part 14. The back part 14 bends and extends from an edge of the bottom part 12, the bottom part 12 is configured to bear a frame of the portable terminal 200, and the back part 14 is configured to bear a rear housing of the portable terminal 200. The plug 20 bends and extends from the bottom part 12, the plug 20 and the back part 14 extend in a same direction relative to the bottom part 12, a spacing is provided between the plug 20 and the back part 14, the plug 20 is configured to be inserted into a socket 202 (referring to FIG. 2 and FIG. 3) provided on the frame of the portable terminal 200, and the plug 20 and the supporting part 10 jointly position the portable terminal 200. The holding part 30 includes a handle 32 and a connection part 34. The connection part 34 is connected to the bottom part 12, and the handle 32 is on a side that is of the connection part 34 and that is away from the bottom part 12.

The portable terminal holder 100 provided in the present invention bears a portable terminal 200 by using a supporting part 10; in addition, a plug 20 connected to the supporting part 10 matches a socket 202 of the portable terminal 200 to implement stable connection and positioning between the portable terminal 200 and the portable terminal holder 100; and it is implemented, by using a holding part 30, that a user can hold the portable terminal 200 with one hand, which makes it easy for the user to operate.

Specifically, the supporting part 10 and the plug 20 of the portable terminal holder 100 are integrated together by means of techniques such as shearing and bending by using a sheet metal part. The holding part 30 and the supporting part 10 are in a two-piece structure, and both may be fixedly connected together, or may be detachably installed together. The socket 202 on the frame of the portable terminal 200 may be a common interface such as a micro USB, a mini USB, an HDMI interface, or a Headset jack.

In a process of using the portable terminal holder 100, to ensure that the portable terminal 200 can be charged or that a data cable can be inserted into the portable terminal 200, an interface the same as the socket 202 of the portable terminal 200 may be added to the portable terminal holder 100. A female socket is disposed on the portable terminal holder 100, the plug 20 is used as a male connector, and the plug 20 is electrically connected to the female socket. That is, the socket 202 of the portable terminal 200 is led out and is disposed on the portable terminal holder 100.

Figure 6:
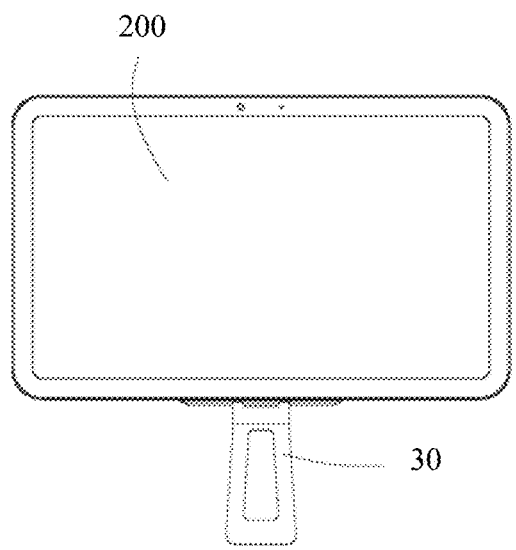
FIG. 6 is a front view in which a portable terminal holder and a portable terminal are used together and a holding part is located in a first position according to an implementation manner of the present invention.
Figure 7:
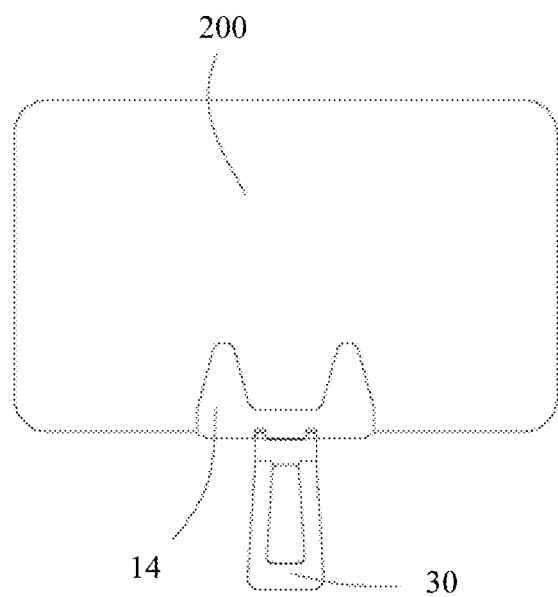
FIG. 7 is a rear view in which a portable terminal holder and a portable terminal are used together and a holding part is located in a first position according to an implementation manner of the present invention.
Figure 8:
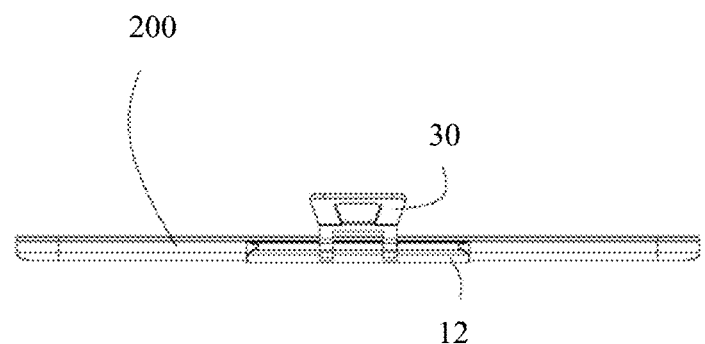
FIG. 8 is a bottom view in which a portable terminal holder and a portable terminal are used together and a holding part is located in a first position according to an implementation manner of the present invention.
Figure 9:
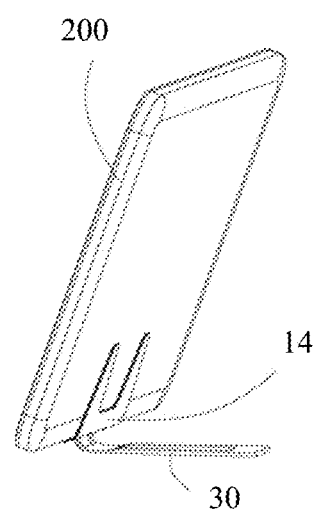
FIG. 9 is a three-dimensional diagram in which a portable terminal holder and a portable terminal are used together and a holding part is located in a second position according to an implementation manner of the present invention.
Figure 10:
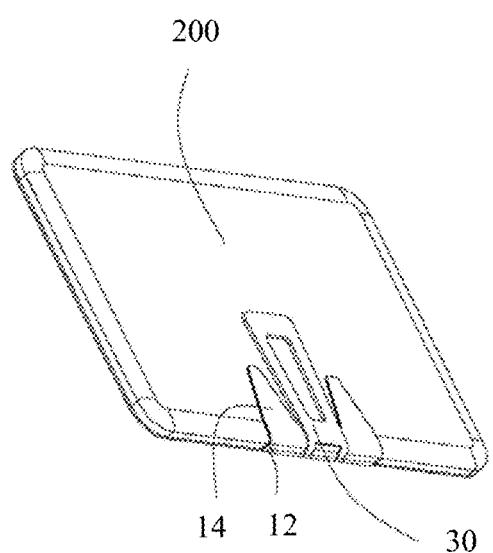
FIG. 10 is a three-dimensional diagram in which a portable terminal holder and a portable terminal are used together and a holding part is located in a third position according to an implementation manner of the present invention.

In an implementation manner, the portable terminal holder 100 further includes a pin-jointed structure 300. The pin-jointed structure 300 is connected between the holding part 30 and the supporting part 10, and is configured to rotationally connect the connection part 34 of the holding part 30 to the bottom part 12 of the supporting part 10, so that the holding part 30 can rotate relative to the supporting part 10. Referring to FIG. 6 to FIG. 10, the pin-jointed structure 300 positions the holding part 30 in a first position, a second position, or a third position. As shown in FIG. 6 to FIG. 8, when the holding part 30 is positioned in the first position, the handle 32 is in an extended state relative to the supporting part 10, and the handle 32 is configured to be held by a user. As shown in FIG. 9, when the holding part 30 is positioned in the second position, the handle 32 bends relative to the supporting part 10, and the handle 32 is configured to support the portable terminal holder 100 on a countertop together with the portable terminal 200. As shown in FIG. 10, when the holding part 30 is positioned in the third position, the holding part 30 fits closely to the supporting part 10; the holding part 30 occupies small space and is easy to carry.

The pin-jointed structure 300 is disposed, so that the portable terminal holder 100 in the present invention has multiple usage states and is easy for the user to use.

Specifically, the pin-jointed structure 300 may be a shaft with a positioning structure, for example, a shaft structure of a notebook computer, and the shaft is directly installed between the holding part 30 and the supporting part 10. Because this type of shaft is a common structure, a specific structure thereof is not described in detail. Alternatively, the pin-jointed structure 300 may be a simple rotational structure in which an axle and a hole match. For example, referring to FIG. 4 and FIG. 5, a pair of cylindrical axles 36 are saliently disposed on the holding part 30, a pair of holes 16 are disposed on the supporting part 10, and the pair of holes 16 match the axles 36 on the holding part 30, to implement rotation between both. On this basis, a positioning fixture block and a groove may match to position the holding part 30 in the foregoing three different positions. For example, a fixture block is saliently disposed on a periphery of the axle 36, and multiple grooves are disposed on an inner wall of the hole 16. The fixture block matches different grooves to position the handle 32 in the different positions.

When the holding part 30 is positioned in the first position, an included angle between the handle 32 and the back part 14 of the supporting part 10 is close to 180 degrees. When the holding part 30 is positioned in the second position, an included angle between the handle 32 and the back part 14 of the supporting part 10 is greater than 60 degrees and less than 90 degrees.

In this implementation manner, the bottom part 12 is perpendicular to the back part 14, and the supporting part 10 fits completely to the bottom part 12 and the back part 14 of the portable terminal 200, so that the portable terminal holder 100 and the portable terminal 200 are connected together more stably.

In this implementation manner, the plug 20 is located in a central position of the bottom part 12. Correspondingly, the socket 202 of the portable terminal 200 is also located in a central position on a side of the portable terminal 200. In this way, a matching position of the plug 20 and the socket 202 is on a central line of the portable terminal 200, to achieve better balance in terms of force bearing.

Figure 4:
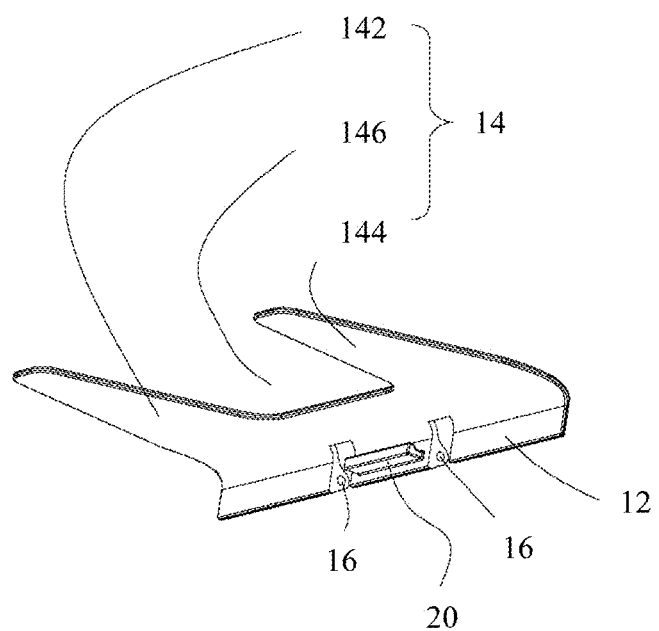
FIG. 4 is a three-dimensional schematic diagram of a supporting part and a plug of a portable terminal holder according to an implementation manner of the present invention.
Figure 5:
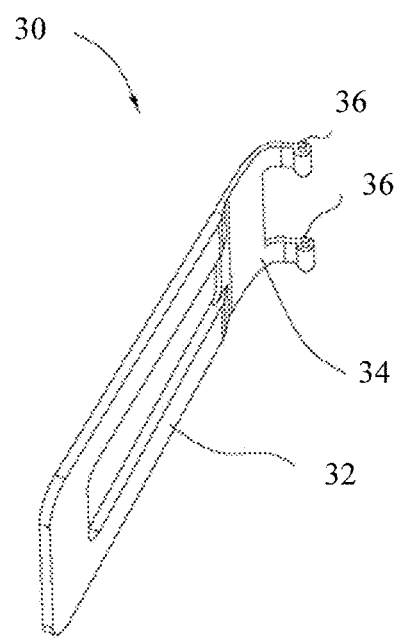
FIG. 5 is a three-dimensional schematic diagram of a holding part of a portable terminal holder according to an implementation manner of the present invention.

In this implementation manner, as shown in FIG. 4, the back part 14 of the supporting part 10 includes a first back 142 and a second back 144, there is a hollow region 146 between the first back 142 and the second back 144, and a projection of the first back 142 on the bottom part 12 and a projection of the second back 144 on the bottom part 12 are respectively on both sides of the plug 20. In this case, the first back 142 and the second back 144 are symmetrically arranged on the both sides of the plug 20, so that support force of the portable terminal holder 100 for the portable terminal 200 is better balanced, thereby enhancing supporting stability.

In this implementation manner, both the supporting part 10 and the holding part 30 are a metal sheet metal part. The supporting part 10 and the holding part 30 that are formed by punching by using metal sheet metal parts have good strength and texture. In another implementation manner, the supporting part 10 and the holding part 30 maybe formed by means of injection molding by using plastic cement.

As a further improvement to the present invention, an anti-slip layer (not shown in the figure) is wrapped around an outer surface of the handle 32 of the holding part 30. A design of the anti-slip layer can make the user feel better, and the anti-slip layer has an anti-slip function. The anti-slip layer may be a silica gel layer that is integrated with the handle 32 together, or a cover, of the handle 32, with anti-slip veins. The handle 32 is detachably sheathed with the cover of the handle 32, and the cover of the handle 32 is replaceable.

As a further improvement to the present invention, the handle 32 has a telescopic structure (not shown in the figure). A structure similar to that of a telescopic bar of a draw-bar box may be used, and because of the telescopic structure, the handle 32 can extend for different dimensions according to different requirements (for example, different sizes of user palms).

As a further improvement to the present invention, the supporting part 10 further includes a magnetic region (not shown in the figure), and fixation between the portable terminal holder 100 and the portable terminal 200 is strengthened by magnetic force between the magnetic region and the portable terminal 200. Further, the magnetic region includes a magnetic material, and the magnetic material is embedded in the bottom part 12 or the back part 14.

When the portable terminal holder 100 provided in the present invention is being designed, a specific size, weight, and structure of a portable terminal 200 that is used together with the portable terminal holder 100 need to be considered. A design of a structure of each part of the portable terminal holder 100 is very relevant to the portable terminal 200. Therefore, an angular relationship, a dimension relationship, and the like between a supporting part 10, a plug 20, and a holding part 30 of the foregoing portable terminal holder 100 are not specifically limited. Specific relationships need to be set according to a specific product in an actual product design process.

The foregoing describes in detail the portable terminal holder provided in the embodiments of the present invention. In this specification, specific examples are used to describe the principle and implementation manners of the present invention, and the description of the embodiments is only intended to help understand the method and core idea of the present invention. In addition, a person of ordinary skill in the art may make modifications with respect to the specific implementation manners and the application scope based on the idea of the present invention. Therefore, the content of this specification shall not be construed as a limitation to the present invention.

What is claimed is:

1. A portable terminal holder, comprising:
   a supporting part, comprising a bottom part and a back part, wherein the back part bends and extends from an edge of the bottom part, the bottom part is configured to bear a frame of a portable terminal, and the back part is configured to bear aback of the portable terminal;
   a plug, bending and extending from the bottom part, wherein the plug and the back part extend in a same direction relative to the bottom part, a spacing is provided between the plug and the back part, and the plug is configured to be inserted into a socket provided on the frame of the portable terminal, so that the plug and the supporting part jointly position the portable terminal; and
   a holding part, comprising a handle and a connection part, wherein the connection part is connected to the bottom part, and the handle is on a side that is of the connection part and that is away from the bottom part; and
   a pin-jointed structure configured to:
      rotationally connect the connection part to the bottom part, so that the holding part can rotate relative to the supporting part; and
      position the holding part in a first position, a second position, or a third position, wherein:
         when the holding part is positioned in the first position, the handle is configured to be held by a user,
         when the holding part is positioned in the second position, the handle is configured to support the portable terminal holder on a countertop together with the portable terminal, or
         when the holding part is positioned in the third position, the holding part fits closely to the supporting part.

2. The portable terminal holder according to claim 1, wherein the bottom part is perpendicular to the back part.

3. The portable terminal holder according to claim 1, wherein the plug is located in a central position of the bottom part.

4. The portable terminal holder according to claim 1, wherein both the supporting part and the holding part are a metal sheet metal part.

5. The portable terminal holder according to claim 1, further comprising:
   an anti-slip layer wrapped around an outer surface of the handle of the holding part.

6. A portable terminal holder, comprising:
   a supporting part, comprising a bottom part and a back part, wherein the back part bends and extends from an edge of the bottom part, the bottom part is configured to bear a frame of a portable terminal, and the back part is configured to bear a back of the portable terminal;

a plug, bending and extending from the bottom part, wherein the plug and the back part extend in a same direction relative to the bottom part, a spacing is provided between the plug and the back part, and the plug is configured to be inserted into a socket provided on the frame of the portable terminal, so that the plug and the supporting part jointly position the portable terminal;

a holding part, comprising a handle and a connection part, wherein the connection part is connected to the bottom part, and the handle is on a side that is of the connection part and that is away from the bottom part;

wherein the back part comprises a first back and a second back, there is a hollow region between the first back and the second back, and a projection of the first back on the bottom part and a projection of the second back on the bottom part are respectively on both sides of the plug.

* * * * *